(12) United States Patent
Almolda Fandos et al.

(10) Patent No.: US 11,856,679 B2
(45) Date of Patent: Dec. 26, 2023

(54) INDUCTION FURNACE DEVICE

(71) Applicant: BSH Hausgeräte GmbH, Munich (DE)

(72) Inventors: Manuel Almolda Fandos, Saragossa (ES); Pablo Jesus Hernandez Blasco, Saragossa (ES); Izaskun Jaca Equiza, Saragossa (ES); Ignacio Lope Moratilla, Saragossa (ES); Damaso Martin Gomez, Saragossa (ES); Alvaro Rigual Iturria, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 527 days.

(21) Appl. No.: 17/053,370

(22) PCT Filed: May 24, 2019

(86) PCT No.: PCT/IB2019/054317
§ 371 (c)(1),
(2) Date: Nov. 6, 2020

(87) PCT Pub. No.: WO2019/243921
PCT Pub. Date: Dec. 26, 2019

(65) Prior Publication Data
US 2021/0195701 A1    Jun. 24, 2021

(30) Foreign Application Priority Data
Jun. 21, 2018 (ES) ............... ES201830618

(51) Int. Cl.
*H05B 6/12* (2006.01)
*H05B 6/36* (2006.01)

(52) U.S. Cl.
CPC ............ *H05B 6/129* (2013.01); *H05B 6/36* (2013.01); *H05B 2206/022* (2013.01)

(58) Field of Classification Search
CPC .... H05B 2206/022; H05B 6/129; H05B 6/36; H05B 6/367; B23Q 1/28; B25B 5/062; B25B 5/16; B25J 13/082; B66F 9/183; B66F 9/184; B66F 9/22; Y02B 40/00
USPC ....... 219/622, 624, 620, 630, 634, 635, 647, 219/672, 675, 447.1, 448.17
See application file for complete search history.

(56) References Cited

U.S. PATENT DOCUMENTS

| 4,675,507 A | 6/1987 | Akiyoshi et al. |
| 11,438,975 B2 * | 9/2022 | Acero Acero ......... H05B 6/362 |
| 2006/0191912 A1 | 8/2006 | Roth |
| 2010/0059513 A1 | 3/2010 | Dughiero |

(Continued)

FOREIGN PATENT DOCUMENTS

ES    2100810 A1    6/1997

OTHER PUBLICATIONS

National Search Report ES 201830618 dated Jun. 21, 2018.
(Continued)

*Primary Examiner* — Quang T Van
(74) *Attorney, Agent, or Firm* — Michael E. Tschupp; Andre Pallapies; Brandon G. Braun

(57) ABSTRACT

An induction oven device includes a heating unit including an induction coil having an electrical conductor, a substrate unit having a through-flow opening, and a fastening unit configured to fasten the induction coil to the substrate unit. The fastening unit includes a fastening element which is guided through the through-flow opening.

23 Claims, 8 Drawing Sheets

(56) References Cited

U.S. PATENT DOCUMENTS

2011/0155723 A1   6/2011  Liu
2020/0077472 A1   3/2020  De La Cuerda Ortin et al.

OTHER PUBLICATIONS

International Search Report PCT/IB2019/054317 dated Sep. 4, 2019.
National Search Report CN 201980041454.4 dated May 9, 2022.

* cited by examiner

INDUCTION FURNACE DEVICE

CROSS-REFERENCES TO RELATED APPLICATIONS

This application is the U.S. National Stage of International Application No. PCT/IB2019/054317, filed May 24, 2019, which designated the United States and has been published as International Publication No. WO 2019/243921 A1 and which claims the priority of Spanish Patent Application, Serial No. P201830618, filed Jun. 21, 2018, pursuant to 35 U.S.C. 119(a)-(d).

BACKGROUND OF THE INVENTION

The invention relates to an induction oven device and to a method for producing an induction oven device.

Cooktops are known from the prior art, which have heating units with induction coils which are fastened to a substrate unit. The substrate unit is provided to hold the induction coils in relation to a cooktop plate and to define a course of a conductor of the induction coil. Various methods of fastening the induction coils to the substrate unit are known, for example it is known to use clamps, screws, flaps, adhesives and plastic profiles. These known solutions, however, are only suitable for operating temperature of over 500° C. to a limited extent, as the use of special heat-resistant materials is expensive and established fixing methods are not designed for a thermal expansion of the induction coil.

BRIEF SUMMARY OF THE INVENTION

The object of the invention consists in particular in providing a generic device with improved properties with respect to robustness and cost-effectiveness.

The invention is based on an induction oven device with at least one heating unit, which has at least one induction coil with at least one electrical conductor, at least one substrate unit and at least one fastening unit with at least one fastening element, which fastens the induction coil to the substrate unit.

In one aspect of the invention, it is proposed for the substrate unit to have at least one through-flow opening, through which at least the fastening element is guided. In particular, a simple and cost-effective fastening of the induction coil can be achieved as a result. Advantageously, a fastening of the induction coil to the substrate unit can be produced by established methods which can be performed automatically.

An "induction oven device" is to be understood in particular as meaning at least a part, in particular a subassembly of an induction oven, wherein in particular accessory units for the induction oven may additionally be included, such as for example a sensor unit for external measurement of a temperature of an item of cookware and/or a food to be cooked. In particular, the induction oven device may also comprise the entire induction oven. An "induction oven" is to be understood in particular as meaning a household appliance which has at least one cooking compartment, at least one cooking muffle, at least one oven door and at least one heating unit, wherein the cooking compartment is outwardly delimited by the cooking muffle and the oven door and wherein the heating unit is provided to heat an item of cookware and/or food to be cooked situated in the cooking compartment to a predefined temperature during an operation of the induction oven, at least for preparation and/or storage, by way of an alternating field induced by the heating unit and to keep said item of cookware and/or food to be cooked at said predefined temperature.

Preferably, the induction oven has at least an inner housing and outer housing. An "inner housing" is to be understood in particular as meaning a wall unit which at least for the most part outwardly delimits at least one interior, in particular a cooking compartment, and itself is outwardly delimited at least by the outer housing. Advantageously, the inner housing features a ferromagnetic metal. Particularly advantageously, the induction coil is provided to inductively heat at least a part of the inner housing during an operation of the cooking appliance device. Preferably, the part of the inner housing comprises a top wall and/or a bottom wall of the inner housing, in particular in order to provide a conventional heating mode, also known as "top and bottom heating". Preferably, the inner housing is embodied as a cooking muffle. A "cooking muffle" is to be understood as meaning an inner housing which, together with an oven door of the induction oven, at least for the most part outwardly delimits a cooking compartment of an induction oven. An "oven door" is to be understood in particular as meaning a wall which, in a closed state, fully covers an opening of the cooking compartment which faces an operator and, in an opened state, at least partially releases the opening. An "outer housing" of an appliance is to be understood in particular as meaning a wall unit which at least for the most part defines an outer area of the appliance. In this context, "at least for the most part" is to be understood in particular as meaning at least 60%, advantageously at least 70%, particularly advantageously at least 80%, preferably at least 90% and particularly preferably fully.

A "heating unit" is to be understood in particular as meaning a unit which is provided to heat at least one food to be cooked and/or item of cookware arranged in a predefined heating region, and/or to keep said food to be cooked and/or item of cookware warm. In particular, the heating unit has at least one induction coil, through which current flows in particular during an operation of the heating unit and which generates at least one electromagnetic field for heating the food to be cooked and/or item of cookware and/or keeping said food to be cooked and/or item of cookware warm. The induction coil has at least one conductor, which for example can be produced by a punching and/or sawing and/or cutting, in particular beam cutting, of a metal plate. In particular, the conductor may be embodied as an individual wire and/or preferably as a Litz wire. In particular, a Litz structure of a conductor embodied as a Litz wire may compensate for the thermal expansion of the conductor. Advantageously, the conductor has at least one coating, which insulates the conductor thermally and/or electrically.

A "substrate unit" is to be understood in particular as meaning a unit which in particular can be connected to the inner housing in a fixed manner and which is provided to hold the induction coil in relation to the inner housing and/or the item of cookware and/or food to be cooked which is/are to be heated. In particular, the substrate unit is arranged between the induction coil and the inner housing. Alternatively, the induction coil could be arranged between the substrate unit and the inner housing. It would be conceivable for the cooking appliance device to have a plurality of substrate units, which in particular are arranged in a stacked manner and preferably hold a winding of the induction coil between individual layers in each case. It would be conceivable for the inner housing to serve an accommodation of at least the heating unit. For example, the substrate unit could be adhesively bonded and/or riveted and/or screwed to the inner housing. It would be conceivable for the substrate unit to be fastened directly to the inner housing, in particular to be embodied in one piece with the inner housing. This makes it possible to minimize a distance between the induction coil and the inner housing in particular. "Embodied in one piece" is to be understood in particular as meaning connected with a material fit, for example by a welding process, an adhesive bonding process, an injection molding process and/or another process appearing suitable to the person skilled in the art, and/or advantageously understood as meaning molded in one piece, such as by producing from a cast iron and/or by producing in a single or multi-component injection method and advantageously from a single blank.

In particular, the substrate could be fastened to the inner housing indirectly. Furthermore, the heating unit could have at least one thermal isolation, via which the substrate unit is fastened indirectly to the inner housing. Preferably, the substrate unit has at least one heat-resistant material. A "heat-resistant material" is to be understood in particular as meaning a material which withstands temperatures of at least 500° C., advantageously at least 550° C. and preferably at least 600° C., without changing from a chemical perspective. Particularly advantageously, the substrate unit has at least one electrically insulating material. An "electrically insulating material" is to be understood in particular as meaning a material which has a specific electrical resistance of at least $10^{12}$ ($\Omega$ mm$^2$)/m and in particular is non-conductive, at least in relation to a current flowing through the induction coil during operation. It would be conceivable for the substrate unit to at least partially consist of at least one heat-resistant plastic.

A "fastening unit" is to be understood in particular as meaning a unit which is provided to fasten the induction coil to the substrate unit at least partially, in particular fully. In particular, the fastening unit is embodied separately from the substrate unit and/or the conductor. Preferably, the fastening unit has at least one heat-resistant and/or electrically insulating material. Advantageously, it is possible to dispense with a use of additional thermal insulations for the fastening unit and/or the substrate unit. For example, the fastening unit could have a material which is identical to a material of the substrate unit. In particular, the fastening unit may have at least one fastening element for fastening the induction coil to the substrate unit. The fastening element may for example be a clamp, a screw, a flap, an adhesive and/or a plastic profile.

A "through-flow opening" is to be understood in particular as meaning a recess of the substrate unit which is at a distance from an edge of the substrate unit, and through which a first side of the substrate unit, which preferably runs along a main extension plane of the substrate unit, is connected to a second side of the substrate unit which lies opposite the first side. Preferably, the substrate unit has a large number of through-flow openings, which in particular are arranged periodically in parallel with the conductor. Particularly preferably, in an installed state the through-flow openings run along at least a majority of the conductor, in particular the entire conductor. Particularly preferably, the through-flow opening can be widened. In this context, an "opening which can be widened" is to be understood as meaning an opening, the circumference of which can be extended to at least twice, advantageously at least three times, particularly advantageously at least four times, preferably at least five times and particularly preferably at least six times the length.

The fastening element being "guided through the through-flow opening" is to be understood in particular as meaning that the fastening element has at least one contiguous subregion which in an installed state extends from the first side of the substrate unit to the second side of the substrate unit.

"Provided" is to be understood in particular as meaning especially designed and/or equipped. An object being provided for a particular function is to be understood in particular as meaning that the object fulfills and/or carries out this particular function in at least one application and/or operating state.

In a further aspect of the invention, which can be considered separately or in combination with the remaining aspects of the invention, it is proposed that the substrate unit features at least one silicate. A "silicate" is to be understood in particular as meaning a material which at least contains the chemical elements of silicon and oxygen. In particular, a silicate is to be understood as meaning a salt and/or an ester of an orthosilicic acid and in particular also the condensate thereof. In particular, this should be understood as meaning a mineral, the chemical composition thereof has at least one $SiO_4$ tetrahedron. Exemplary applications of silicate are fibers and/or glasses. Preferably, the substrate unit features at least basalt, spar, dolomite, diabase, anorthosite, coke, glass fibers, water glass and/or mica. Preferably, the substrate unit consists of the silicate at least partially, preferably for the most part and particularly advantageously fully. Particularly preferably, the substrate unit is embodied in a mat-like manner. A "mat-like element" is understood in particular as meaning an element for which a smallest possible notional cuboid exists, which just barely accommodates the element, whose shortest side corresponds to at most 30%, advantageously at most 20%, particularly advantageously at most 10%, preferably at most 5% and particularly preferably at most 2% of a longest side of the cuboid. In particular, a mat-shaped element can be stretched, preferably can be folded. In particular, the substrate unit may also be embodied in a plate-shaped manner. Preferably, the substrate unit has a thickness of at most 500 µm, advantageously at most 450 µm, particularly advantageously at most 400 µm, preferably at most 300 µm and particularly preferably at most 200 µm. This makes it possible to raise robustness and cost-effectiveness in particular. Advantageously, a thermal and/or electrical insulation of the induction coil may be provided. Particularly advantageously, it is possible to dispense with additional components for a thermal and/or electrical insulation of the induction coil.

It is further proposed for the fastening element to feature at least one silicate. In particular, a silicate of the fastening element may be different from a silicate of the fastening unit. Preferably, the silicate of the fastening element is identical to the silicate of the fastening unit. This makes it possible to raise robustness in particular. It is advantageously possible to avoid a recess in the thermal and/or electrical insulation of the induction coil generated by guiding the fastening element through the through-flow opening.

Furthermore, it is proposed for the substrate unit to be able to be pierced through, at least partially, in order to fasten the induction coil. The substrate unit being "able to be pierced through at least partially" is to be understood in particular as meaning that the substrate unit has at least one subregion which comprises at least a first subregion of the first side of the substrate unit and a second subregion of the second side of the substrate unit, which can be pierced through by a preferably elongated object in order to generate and/or widen the through-flow opening, advantageously without damaging further surrounding subregions of the substrate unit. It would be conceivable for the substrate unit to be able to be pierced through by the fastening element. Preferably, the substrate unit can be pierced through by a further element, for example a needle and/or a punching tool and/or a cutting tool. This makes it possible to achieve a simple and cost-effective production and/or adjustment of the induction oven device in particular. Advantageously, the through-flow opening can be generated and/or widened by established and cost-effective methods.

Advantageously, the substrate unit is at least partially fibrous. A "fibrous element" is to be understood in particular as meaning an element which at least partially consists of fibers. A "fiber" is to be understood in particular as meaning an elongated, mat-shaped element which is at least partially pliable. In this context, an "at least partially pliable element" is to be understood in particular as meaning that the element can experience curvatures of at least 20°, advantageously at least 30°, particularly advantageously at least 40°, preferably at least 50° and particularly preferably at least 60°, without experiencing a permanent deformation and/or damage. Preferably, the element is pliable enough in order to permit a combination of numerous such elements according to at least one predefined one-dimensional pattern, preferably to form a yarn and/or twine and/or a cord. Advantageously, the substrate unit is fully fibrous. It would be conceivable for the substrate unit to be at least partially wound around the induction coil. Preferably, the through-flow opening is embodied as a widened distance between individual fibers of the substrate unit. This makes it possible to raise robustness and to achieve a simple production of the substrate unit in particular. Advantageously, damage to the substrate unit due to a bending process can be avoided. Particularly advantageously, the substrate unit can be adjusted in a simple manner by adding further fibers. Furthermore, piercing through the substrate unit can be performed in a simple manner to generate and/or widen the through-flow opening.

Preferably, the substrate unit has at least one textile structure with a flat shape. Advantageously, the substrate unit is fully formed from the textile structure with a flat shape. A "textile structure with a flat shape" is to be understood in particular as meaning a structure which is formed from a large number of fibers, in particular fiber strands, which are combined according to at least one predefined, mat-shaped pattern. Exemplary textile structures with a flat shape include woven fabric and/or knitted fabric and/or crocheted fabric and/or braided fabric and/or stitched fabric and/or non-woven fabric and/or felt. This makes it possible to achieve an effective thermal and/or electrical insulation of the induction coil in a simple and cost-effective manner in particular. Advantageously, recesses in the thermal and/or electrical insulation of the induction coil can be avoided. Particularly advantageously, the substrate unit can be produced and/or adjusted in a simple and cost-effective manner.

Furthermore, it is proposed for the fastening element to be embodied as a thread and the induction coil to be fastened to the substrate unit by means of at least one seam which has the threads. In particular, the threads are able to penetrate the substrate unit according to various standardized stitching methods, which are listed in ASTM D-6193 and ISO 4915: 1991 in particular. For example, the seam and/or the further seams could run according to a lockstitch method and/or a zig-zag method. In particular, a longitudinal direction of the thread may correspond to a longitudinal direction of a nearest conductor segment of the conductor. In particular, piercing through the substrate unit by way of at least one needle and/or at least one punching tool and/or at least one cutting tool forms the generating and/or widening of the through-flow opening. Advantageously, the thread may run over the conductor, at least in segments. Advantageously, the thread may run laterally next to the conductor, at least in segments. This makes it possible to achieve a simple and cost-effective production of the induction oven device in particular. Advantageously, established and cost-effective sewing machines can be used to produce the induction oven device.

In one advantageous embodiment, the substrate unit consists of basalt at least partially, preferably at least for the most part. Preferably, the substrate unit consists of basalt fibers at least partially, preferably fully. In particular, the basalt may contain at least one ferromagnetic material, in particular magnetite. In particular, the substrate unit may consist of pressed basalt fibers. Preferably, the substrate unit consists of basalt fibers which have been combined to form a textile structure with a flat shape. This makes it possible to raise robustness in particular. Advantageously, a compressive strength and impact resistance and heat resistance of the thermal and electrical insulation of the induction coil can be increased.

It is further proposed for the substrate unit to consist of glass fibers at least partially, preferably at least for the most part. It would be conceivable for the substrate unit to fully consist of glass fibers. Furthermore, it would be conceivable for the substrate unit to feature at least one glass-fiber-reinforced plastic. This makes it possible to increase flexibility in particular. Advantageously, a weight reduction and an elasticity of the thermal and electrical insulation of the induction coil can be increased.

Moreover, it is proposed for the fastening unit to have at least one cover element, which is arranged on a side of the induction coil which lies opposite the substrate unit and restricts a movement of the induction coil on this side. It would be conceivable for the fastening unit to have a large number of cover elements, which together cover the entire region. Preferably, the cover element is fastened to the substrate unit by means of the seam and/or further seam having the thread and/or further thread. Preferably, the fastening unit has precisely one cover element, which in particular covers the entire induction coil. In particular, a main extension plane of the cover element runs in parallel with a main extension plane of the induction coil. Advantageously, the cover element has at least one electrically insulating and/or heat-resistant material. Preferably, the cover element has a material which is identical to a material of the substrate unit. In particular, the cover element may be embodied in one piece with the substrate unit. It would be conceivable for the cover element and the substrate unit to be embodied as adjacent subregions of an element of the fastening unit and, advantageously, to be arranged around the induction coil by folding the element. This makes it possible to improve a retaining of the induction coil in particular. Advantageously, a movement of the induction coil along a direction perpendicular to a main extension plane of the substrate unit can be avoided.

Preferably, the cover element features at least one silicate. Particularly preferably, the cover element has a material which is identical to a material of the substrate unit. This makes it possible to achieve a simple production of the induction oven device and an improved thermal and electrical insulation of the induction coil in particular. Advantageously, the cover element can be produced by a method which is identical to a production of the substrate unit.

Particularly advantageously, the induction coil may be thermally and electrically insulated on at least two sides.

The invention is further based on a method for producing an induction oven device with at least one heating unit, which has at least one induction coil with at least one electrical conductor and at least one substrate unit, wherein the induction coil is fastened to the substrate unit.

It is proposed for a fastening element to be guided through the substrate unit in order to fasten the conductor. This makes it possible to provide a method for producing an induction oven device with an increased robustness and a simplified production in particular.

In this context, the induction oven device should not be restricted to the application and embodiment described above. In particular, in order to fulfill a mode of operation described herein, the induction oven device may have a number of individual elements, components and units deviating from a number mentioned herein.

Further advantages result from the following description of the drawing. The drawings show eight different exemplary embodiments of the invention. The drawings, the description and the claims contain numerous features in combination. The person skilled in the art will expediently also consider the features individually and combine them to form useful further combinations.

DETAILED DESCRIPTION OF EXEMPLARY EMBODIMENTS OF THE PRESENT INVENTION

Figure 1:
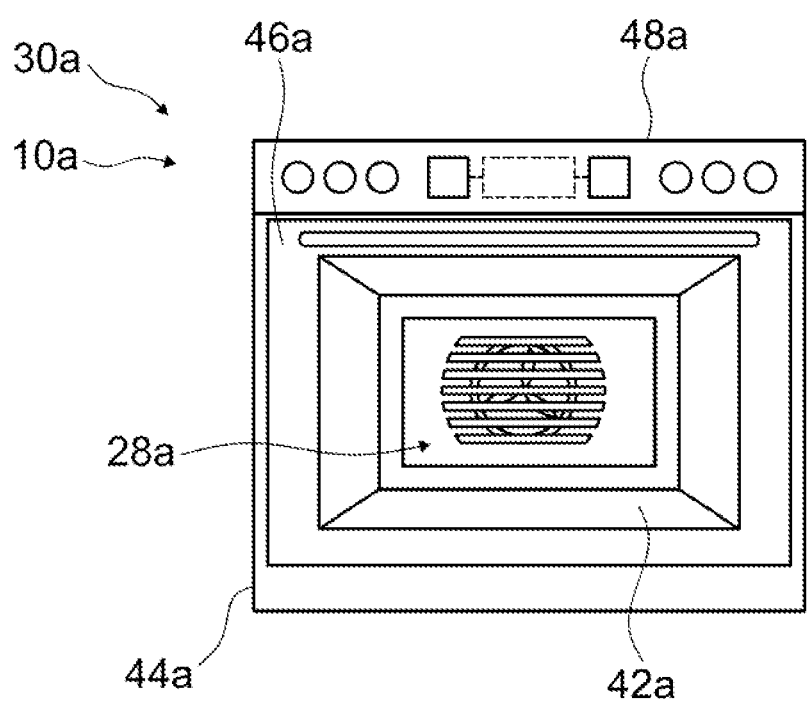
FIG. 1 shows a schematic front view of a cooking appliance with a cooking appliance device.

Only one of the objects present repeatedly in the figures is provided with a reference character in each case.

FIG. 1 shows a cooking appliance 30a. The cooking appliance 30a is embodied as an induction oven. The cooking appliance 30a has an outer housing 44a. The outer housing 44a defines an outer contour of the cooking appliance 30a. The outer housing 44a accommodates a user interface 48a of the cooking appliance 30a. The user interface 48a is provided to be operated by an operator in order to control the cooking appliance 30a. The cooking appliance 30a has an inner housing 42a. The inner housing 42a consists of a ferromagnetic metal. Alternatively, the inner housing 42a could have a non-magnetic material, in particular glass, preferably a glass ceramic. In this alternative embodiment, the inner housing 42a has a plurality of heating elements (not shown), which consist of a ferromagnetic metal. The cooking appliance 30a has an oven door 46a. The oven door 46a is situated in a closed state. The oven door 46a covers an opening 52a of a cooking compartment 28a, which fully faces an operator. The oven door 46a and the inner housing 42a together outwardly delimit the cooking compartment 28a. The cooking appliance 30a has a cooking appliance device 10a. The cooking appliance device 10a is embodied as an induction oven device.

Figure 2:
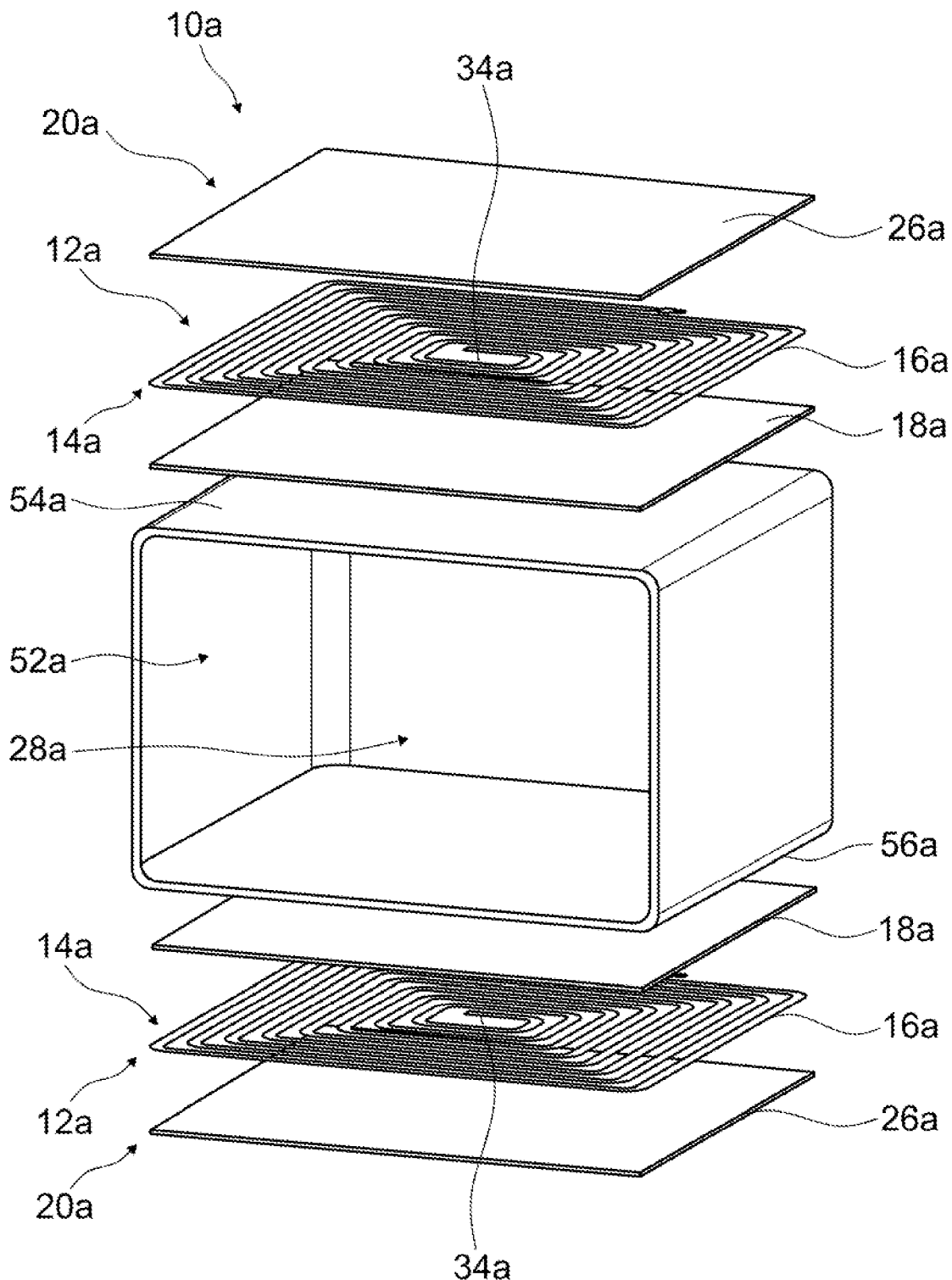
FIG. 2 shows an exploded representation of a part of the cooking appliance device.

One part of the cooking appliance device 10a is shown in more detail in an exploded representation in FIG. 2. The cooking appliance device 10a has the inner housing 42a. The cooking appliance device 10a has two heating units 12a. The heating units 12a are embodied as identical to one another. The heating units 12a are arranged on a top wall 54a and on a bottom wall 56a of the inner housing 42a. Alternatively or additionally it would be conceivable for heating units 12a to be arranged on side walls or a rear wall of the inner housing 42a. Just one of the heating units 12a will now be described.

The heating unit 12a has an induction coil 14a. During operation of the heating unit 12a, an alternating current flows through the induction coil 14a, which generates an electromagnetic alternating field. The induction coil 14a is embodied in a plate-shaped manner. A main extension plane (not shown) of the induction coil 14a runs in parallel with a main extension plane of the top wall 54a and the bottom wall 56a. The induction coil 14a has conductor 16a. The conductor 16a is embodied as an individual wire. The conductor 16a is embodied as a blank individual wire. Alternatively, the conductor 16a could have an insulation. The conductor 16a features aluminum. Alternatively, the conductor 16a could feature copper. The conductor 16a is arranged as a right-angled spiral. The conductor 16a is wound around a coil center 34a of the induction coil 14a.

The heating unit 12a has a substrate unit 18a. The substrate unit 18a is embodied in a mat-like manner. The substrate unit 18a is arranged between the induction coil 14a and the inner housing 42a. The induction coil 14a rests fully against the substrate unit 18a. The substrate unit 18a serves to thermally and electrically insulate the induction coil 14a. The substrate unit 18a at least for the most part consists of a material which features at least the chemical elements Si and O. The material is a silicate. The substrate unit 18a is fibrous. The substrate unit 18*a* consists of mineral wool. The substrate unit 18*a* has basalt fibers. Alternatively or additionally, the substrate unit 18*a* could have spar fibers, dolomite fibers, diabase fibers, anorthosite fibers and/or coke fibers. The substrate unit 18*a* can be pierced through, at least partially, in order to fasten the induction coil 14*a*. The substrate unit 18*a* fully consists of a textile structure with a flat shape. The substrate unit 18*a* fully consists of a woven basalt fabric. Alternatively, the substrate unit 18*a* could partially consist of the woven basalt fabric. The substrate unit 18*a* has a large number of through-flow openings 24*a*. The through-flow openings 24*a* are arranged periodically. The through-flow openings 24*a* are arranged along a large number of straight lines.

Figure 3:
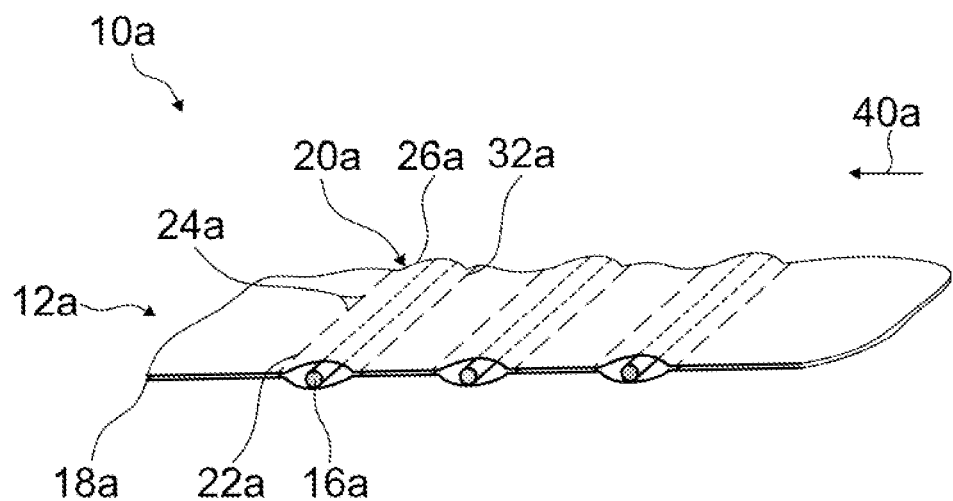
FIG. 3 shows a schematic oblique view of a part of the cooking appliance device with a heating unit.

The heating unit 12*a* has a fastening unit 20 (see FIG. 3). The fastening unit 20*a* fastens the induction coil 14*a* to the substrate unit 18*a*. The fastening unit 20*a* fastens the conductor 16*a* to the substrate unit 18*a* such that it can move in a region in relation to the substrate unit 18*a*. In this context, the region extends over the entire extension of the induction coil 14*a*. The fastening unit 20*a* has a fastening element 22*a*. The fastening element 22*a* is embodied as a thread 22*a*. The induction coil 14*a* is fastened to the substrate unit 18*a* by means of a seam which has the thread 22*a*. The thread 22*a* is fully embodied from silicate. The thread 22*a* is fully embodied from water glass. Alternatively, the thread 22*a* could consist of mineral wool and/or glass fibers. The thread 22*a* is guided through a part of the through-flow openings 24*a*. The thread 22*a* is guided through the through-flow openings 24*a* according to a lockstitch stitching method. In a perpendicular view of the substrate unit 18*a*, the thread 22*a* runs fully laterally next to the conductor 16*a*. The thread 22*a* runs in parallel with the conductor 16*a*. The thread 22*a* runs at a distance from the conductor 16*a*.

The fastening unit 20*a* has a further fastening element 32*a*. The induction coil 14*a* is fastened to the substrate unit 18*a* by means of a further seam which has a further thread 32*a*. The further thread 32*a* is embodied as identical to the thread 22*a*. The further thread 32*a* has a further course which is identical to a course of the thread 22*a*. The further thread 32*a* is guided through a further part of the through-flow openings 24*a*. In a perpendicular view of the substrate unit 18*a*, the further thread 32*a* runs on a side of the conductor 16*a* which lies opposite the thread 22*a*. Before operation of the cooking appliance device 10*a*, a distance between the thread 22*a* and the conductor 16*a* is at least largely identical to a further distance between the further thread 32*a* and the conductor 16*a*.

The fastening unit 20*a* has a cover element 26*a*. Alternatively, the fastening unit 20*a* could have a large number of cover elements 26*a*. The cover element 26*a* features a silicate. The cover element 26*a* has basalt fibers. Alternatively or additionally, the cover element 26*a* could have spar fibers, dolomite fibers, diabase fibers, anorthosite fibers and/or coke fibers. The cover element 26*a* is embodied as identical to the substrate unit 18*a*. The cover element 26*a* is arranged on a side of the induction coil 14*a* which lies opposite the substrate unit 18*a*. The cover element 26*a* and the substrate unit 18*a* are stitched together within the region. The cover element 26*a* and the substrate unit 18*a* are stitched to one another by means of the seam which has the thread 22*a*. The cover element 26*a* and the substrate unit 18*a* are stitched to one another by means of the further seam which has the further thread 32*a*. The cover element 26*a* and the substrate unit 18*a* touch in the region, at least in segments. The cover element 26*a* and the substrate unit 18*a* form an end stop with regard to a permitted movement of the conductor 16*a*. The end stop is formed by the seam and the further seam.

The induction coil 14*a* is fully in contact with the cover element 26*a*. Alternatively, the induction coil 14*a* could exclusively be in contact with the cover element 26*a* in the region. The cover element 26*a* restricts a movement of the induction coil 14*a* on this side. The cover element 26*a*, the thread 22*a* and the further thread 32*a* together define the region. The thread 22*a* and the further thread 32*a* form end stops, at which the substrate unit 18*a* and the cover element 26*a* are stitched. The end stops restrict a movement of the induction coil 14*a* in parallel with a main extension plane of the induction coil 14*a*. In the region, the substrate unit 18*a* and the cover element 26*a* restrict a movement of the induction coil 14*a* perpendicular to the main extension plane of the induction coil 14*a*. Permitted movements of the conductor 16*a* include a movement along a direction 40*a* facing away from a coil center 34*a*, which is facing away from the coil center 34*a* of the induction coil 14*a* in a perpendicular view of the substrate unit 18*a*. The length of the permitted movement along the direction 40*a* is identical to a length by which the conductor 16*a* stretches during operation of the cooking appliance device 10*a*. Permitted movements of the conductor 16*a* include a movement counter to the direction 40*a*.

Figure 4:
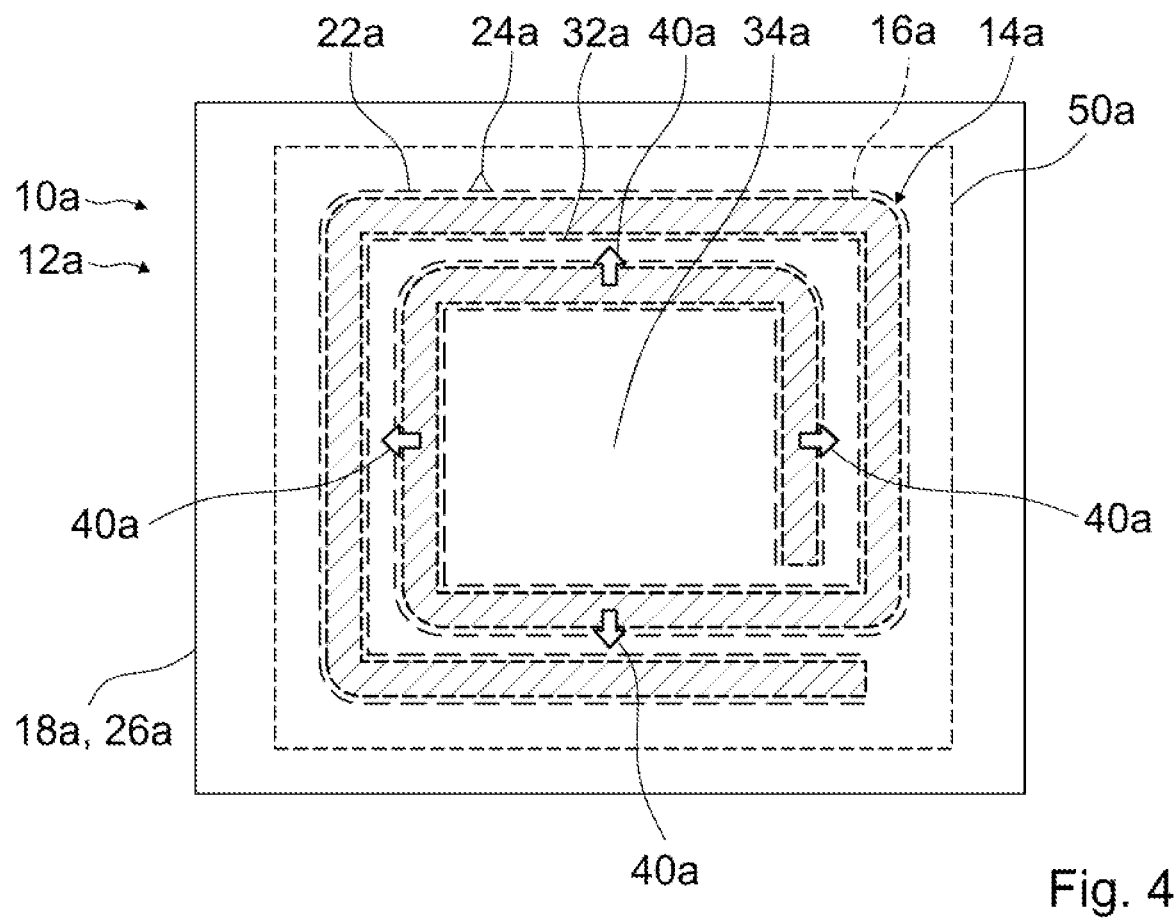
FIG. 4 shows a schematic top view of the heating unit with an induction coil and a substrate unit.

In FIG. 4, the cooking appliance device 10*a* is shown before operation of the cooking appliance device 10*a*. For reasons of clarity, the induction coil 14*a* is represented in a simplified form with a reduced number of windings and an hatched conductor 16*a*. In addition, the distance of the thread 22*a* and the further thread 32*a* from the conductor 16*a* is shown in a reduced manner. The region comprises the entire induction coil 14*a*. The fastening unit 20*a* has an additional thread 50*a*. The additional thread 50*a* runs along a smallest possible rectangle, which just barely accommodates a projection of the induction coil 14*a* onto the substrate unit 18*a*. The additional thread 50*a* fully encircles the induction coil 14*a*. The additional thread 50*a* serves to stabilize the substrate unit 18*a* and the cover element 26*a*. The conductor 16*a* experiences thermal expansions during operation of the cooking appliance device 10*a*. The thermal expansions generate stretching movements of the induction coil 14*a* in the direction 40*a*. The stretching movements are movements of the induction coil 14*a* which are permitted within the region.

Figure 5:
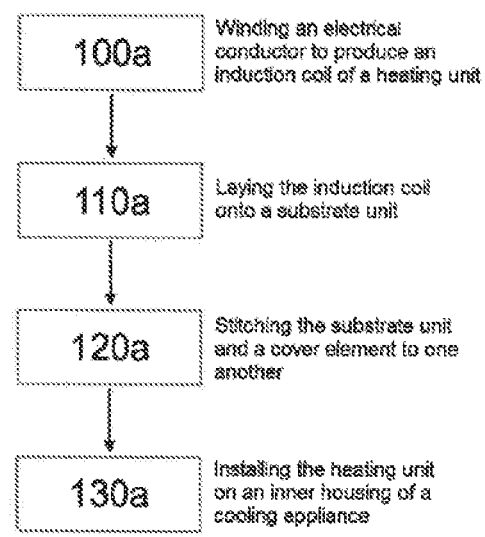
FIG. 5 shows a schematic flow diagram of a method for producing the cooking appliance device.

FIG. 5 shows a schematic flow diagram of a method for producing the cooking appliance device 10*a*. In a winding step 100*a*, the induction coil 14*a* is produced by winding the conductor 16*a*. Alternatively, the induction coil 14*a* could be produced by winding a Litz wire and/or punching out the conductor 16*a* from a metal plate (not shown).

In an insulating step 110*a*, the induction coil 14*a* is laid onto the substrate unit 18*a* and covered by the cover element 26*a*. In this context, the insulating step 110*a* follows the winding step 100*a*.

In a stitching step 120*a*, the substrate unit 18*a* and the cover element 26*a* are pierced through by a needle. The substrate unit 18*a* and the cover element 26*a* are stitched to one another according to the lockstitch stitching method. In this context, the thread 22*a* is guided through a part of the through-flow openings 24*a*. Subsequently, the further thread 32*a* is guided through a further part of the through-flow openings 24*a* in an identical manner. In this context, the stitching step 120*a* follows the insulating step 110.

In an installation step 130*a*, the heating unit 12*a* is installed on the inner housing 42*a*. The heating unit 12*a* is screwed onto the inner housing 42a. Alternatively, the heating unit 12a could also be clamped and/or riveted onto the inner housing 42a.

FIGS. 6a to 9 show further exemplary embodiments of the invention. The following descriptions are essentially restricted to the differences between the exemplary embodiments, wherein with regard to components, features and functions which remain the same, reference can be made to the description of the exemplary embodiment in FIGS. 1 to 5. In order to differentiate the exemplary embodiments, the letter a in the reference characters of the exemplary embodiment in FIGS. 1 to 5 is replaced by the letters b to i in the reference characters of the exemplary embodiments of FIGS. 6a to 9. With regard to parts that remain the same, in particular with regard to parts with the same reference characters, in principle, reference can also be made to the drawings and/or the description of the exemplary embodiment of FIGS. 1 to 5.

For the sake of clarity, conductors 16b-g which are covered by cover elements 26b-g in the following figures are represented with hatching.

Figure 6A:
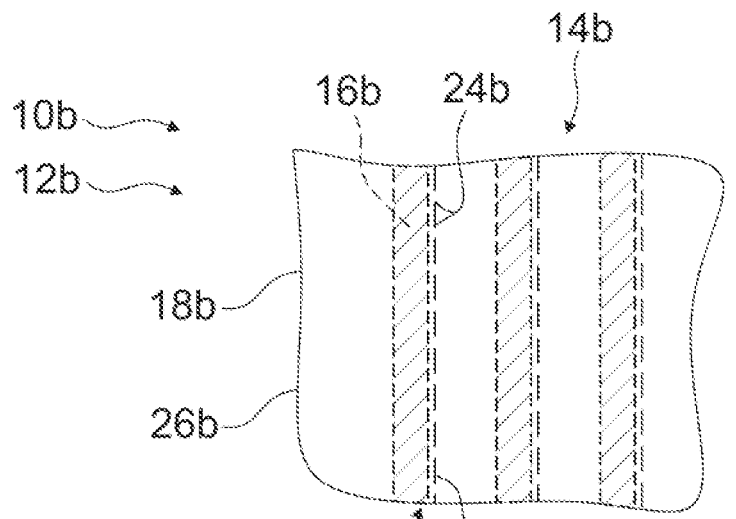
FIG. 6a shows a schematic top view of a part of a cooking appliance device with a first relative arrangement of a conductor in relation to a thread.
Figure 6B:
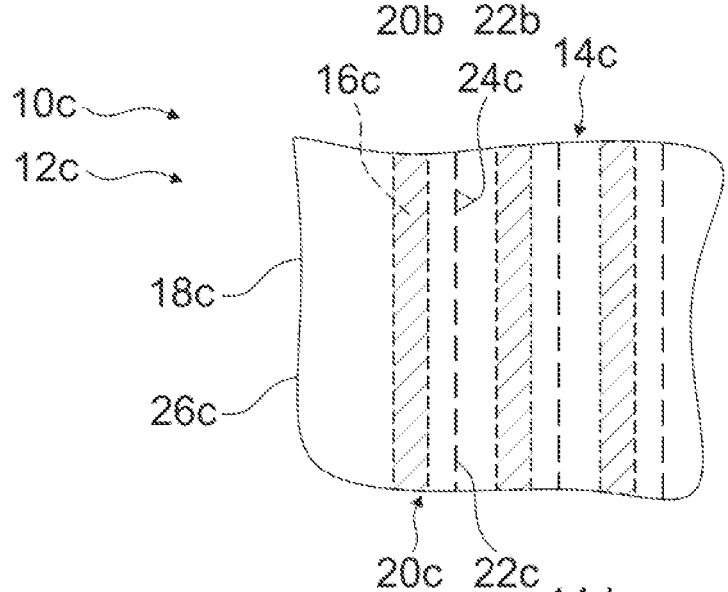
FIG. 6b shows a schematic top view of a part of a cooking appliance device with a second relative arrangement of a conductor in relation to a thread.
Figure 6C:
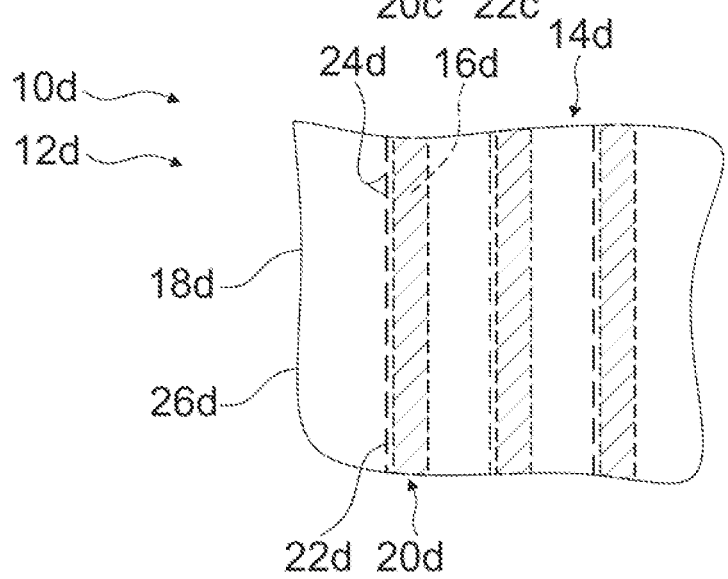
FIG. 6c shows a schematic top view of a part of a cooking appliance device with a third relative arrangement of a conductor in relation to a thread.

In FIGS. 6a-c, a part of cooking appliance devices 10b, 10c, 10d is shown in each case. Induction coils 14b, 14c, 14d of the cooking appliance devices 10b, 10c, 10d are fastened to substrate units 18b, 18c, 18d by means of seams which have threads 22b, 22c, 22d. Cover elements 26b, 26c, 26d are stitched to one another by means of the seams which have the threads 22b, 22c, 22d. In the cooking appliance device 10b, a thread 22b runs along a side of a conductor 16b which is oriented counter to a direction 40b facing away from a coil center (not shown), at a minimum distance from the conductor 16b. The conductor 16b is fastened to the substrate unit 18b such that it largely cannot move counter to the direction 40b. The substrate unit 18b fully consists of glass fibers. In the cooking appliance device 10c, a thread 22c runs along a side of a conductor 16c which is oriented along a direction 40c facing away from a coil center (not shown), at a distance from the conductor 16c. The conductor 16c is fastened to the substrate unit 18c such that it can move along and counter to the direction 40c. In the cooking appliance device 10d, a thread 22d runs along a side of a conductor 16d which is oriented along a direction 40d facing away from a coil center (not shown), at a minimum distance from the conductor 16d. The conductor 16d is fastened to the substrate unit 18d such that it cannot move along the direction 40d.

Figure 7A:
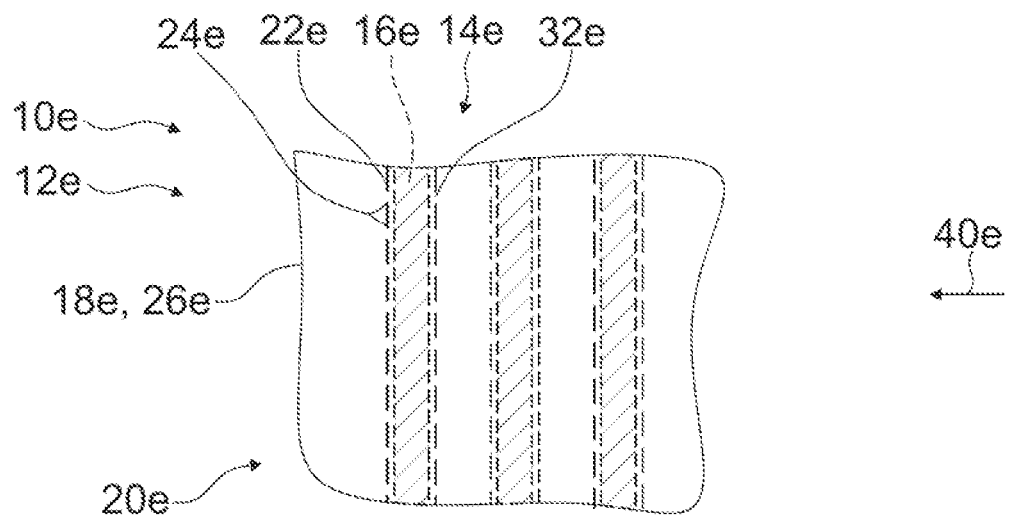
FIG. 7a shows a schematic top view of a part of a cooking appliance device with a further thread at a minimum distance from the side and a thread at a minimum distance from the opposite side.
Figure 7B:
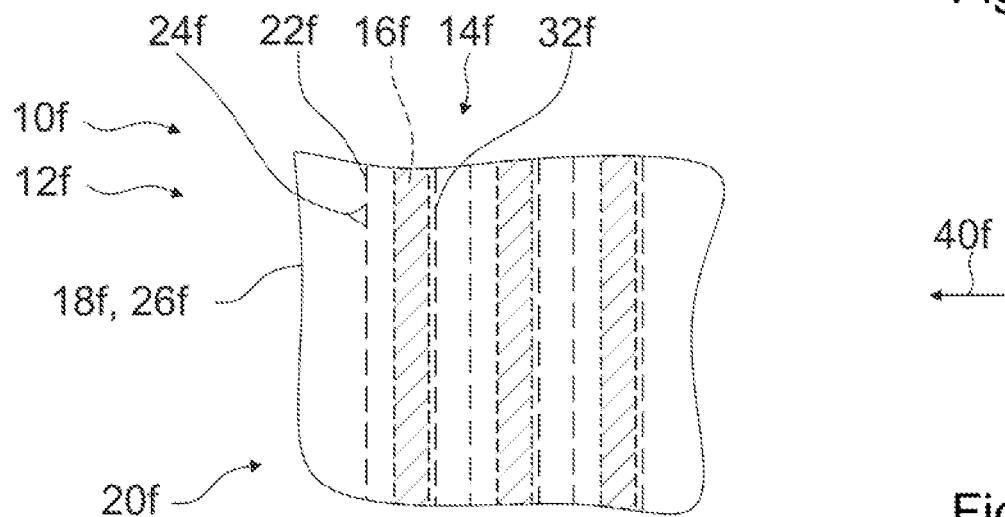
FIG. 7b shows a schematic top view of a part of a cooking appliance device with a further thread at a minimum distance from the side and a thread running at a distance from the opposite side.
Figure 7C:
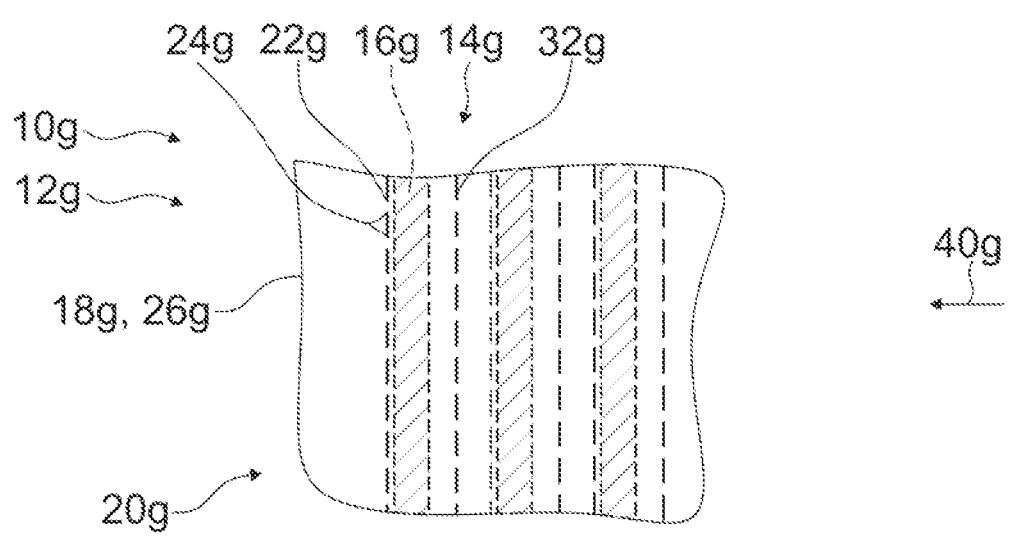
FIG. 7c shows a schematic top view of a part of a cooking appliance device with a further thread running at a distance from the side and a thread at a minimum distance from the opposite side.

In FIGS. 7a-c, a part of cooking appliance devices 10e, 10f, 10g is shown in each case. In the cooking appliance devices 10e, 10f, 10g, threads 22e, 22f, 22g and further threads 32e, 32f, 32g run along opposite sides of conductors 16e, 16f, 16g. In the cooking appliance device 10e, the thread 22e and the further thread 32e run at a minimum distance from the conductor 16e. The conductor 16e is fastened to a substrate unit 18e such that it cannot move along and counter to a direction 40e facing away from a coil center (not shown). In the cooking appliance device 10f, a thread 22f runs at a distance from a conductor 16f. A further thread 32f runs at a minimum distance from the conductor 16f. The conductor 16f is fastened to a substrate unit 18f such that it cannot move counter to a direction 40f facing away from a coil center (not shown). In the cooking appliance device 10g, a thread 22g runs at a minimum distance from a conductor 16g. The thread 32g runs at a distance from a conductor 16g. The conductor 16g is fastened to a substrate unit 18g such that it cannot move along a direction 40g facing away from a coil center (not shown).

Figure 8A:
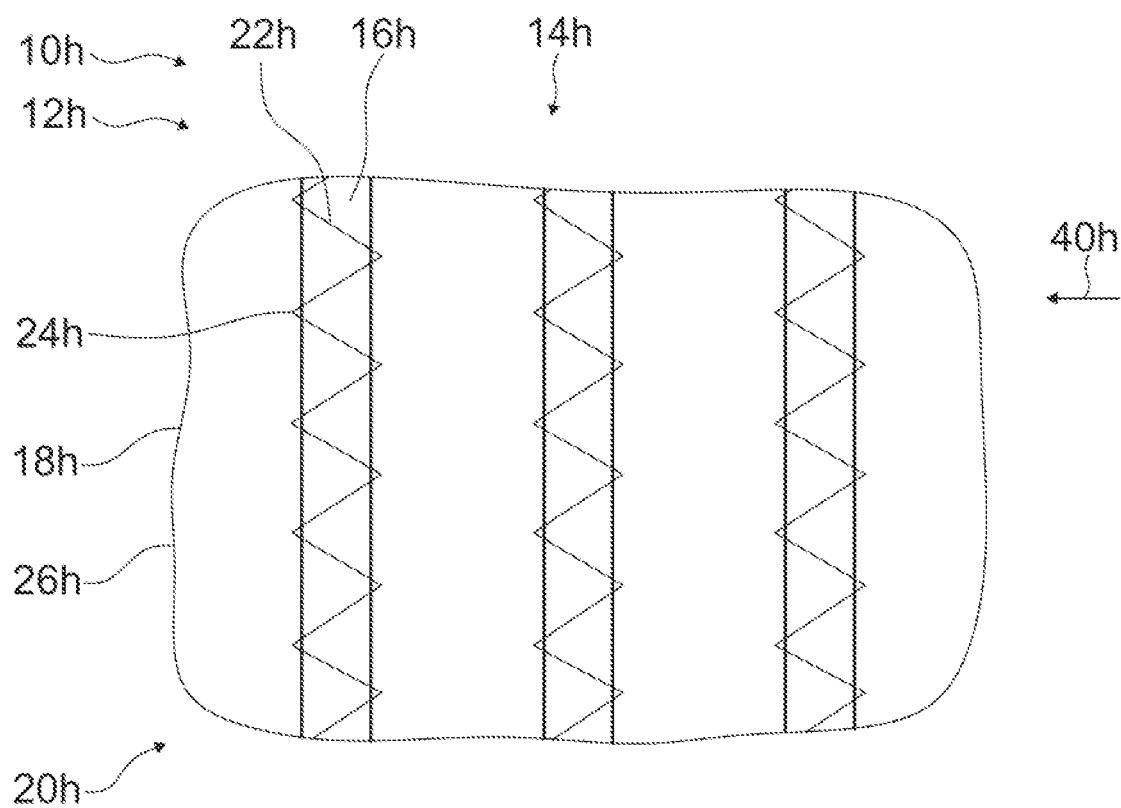
FIG. 8a shows a schematic top view of a cutout of a cooking appliance device with a thread crossing a conductor, which is in contact with the conductor.
Figure 8B:
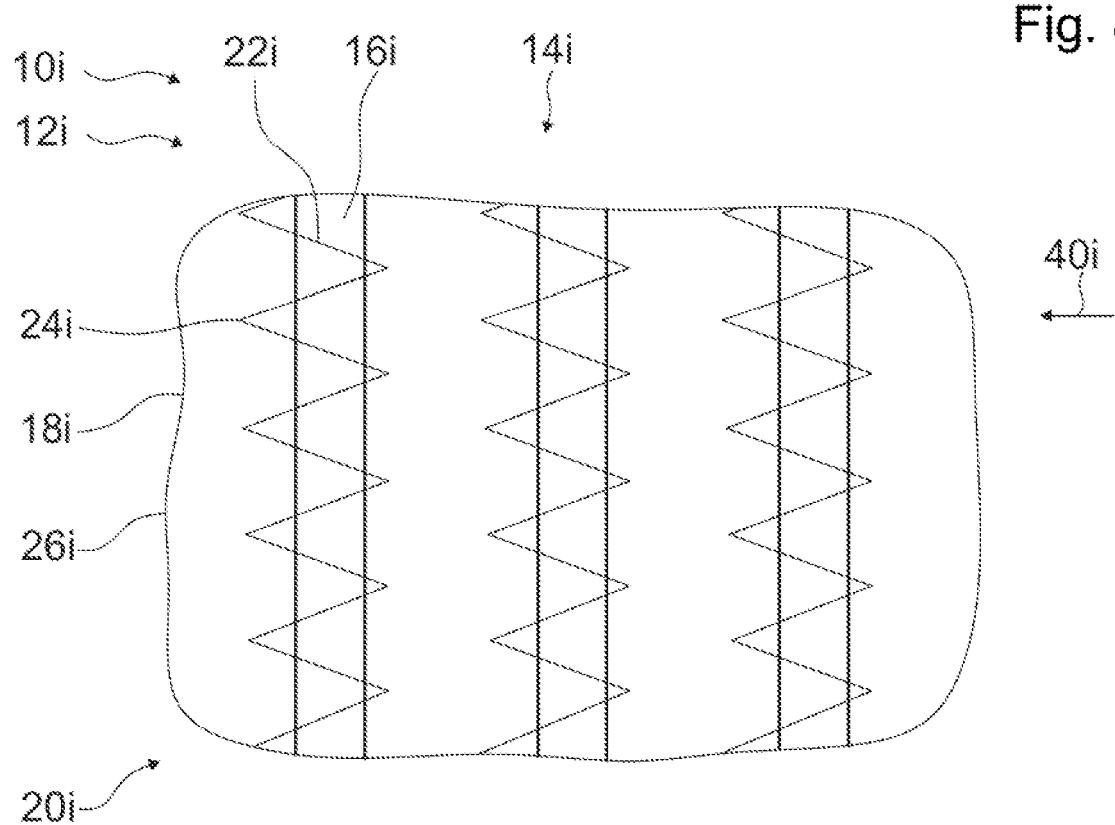
FIG. 8b shows a schematic top view of a cutout of a cooking appliance device with a thread crossing a conductor, which runs at a distance from the conductor in segments.

In FIGS. 8a-b, a part of cooking appliance devices 10h, 10i is shown in each case. Induction coils 14h, 14i of the cooking appliance devices 10h, 10i are fully stitched to substrate units 18h, 18i by threads 22h, 22i. In the cooking appliance devices 10h, 10i the thread 22h, 22i runs over a conductor 16h, 16i, at periodic distances in each case. The thread 22h, 22i runs in a zig-zag pattern in each case. Through-flow openings 24h, 24i form turning points of the zig-zag pattern in each case. The threads 22h, 22i are guided through the through-flow openings 24h, 24i according to a zig-zag stitching method in each case. Alternatively, the threads 22h, 22i run in parallel with the conductors 16h, 16i, in segments, in each case. In the cooking appliance device 10h, the conductor 16h is fastened to the substrate unit 18h such that it cannot move along a main extension plane of the induction coil 14h. The conductor 16h is embodied as a Litz wire. In the cooking appliance device 10i, a portion of the through-flow openings 24i run at a distance from the conductor 16i. Said portion of the through-flow openings 24i are arranged on a side of the conductor 16i which is oriented along a direction 40i facing away from a coil center (not shown). The conductor 16i is fastened to the substrate unit 18i such that it cannot move counter to the direction 40i. The cooking appliance devices 10h, 10i have no cover elements. The seams which have the threads 22h, 22i stitch the induction coils 14h, 14i to one of the substrate units 18h, 18i in each case.

Figure 9:
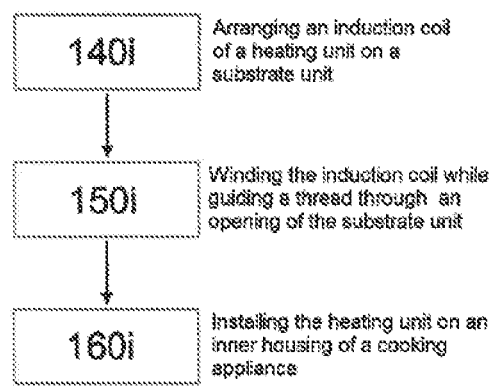
FIG. 9 shows a schematic flow diagram of a further method for producing the cooking appliance device from FIG. 8b.

FIG. 9 shows a flow diagram of a method for producing the cooking appliance device 10i. In a positioning step 140i, the induction coil 14i is arranged on the substrate unit 18i in an unwound state.

In an embroidery step 150i, the induction coil 14i is simultaneously wound while the thread 22i is guided through the through-flow openings 24i according to the zig-zag stitching method. In this context, the embroidery step 150i follows the positioning step 140i.

In an installation step 160i, the heating unit 12i is installed on the inner housing (not shown). The heating unit 12i is screwed onto the inner housing. Alternatively, the heating unit 12i could also be clamped and/or riveted to the inner housing.

The invention claimed is:

1. An induction oven device, comprising:
 a heating unit including an induction coil having an electrical conductor;
 a substrate unit having at least a first through-flow opening and a second through-flow opening;
 a cover element; and
 a fastening unit configured to fasten the induction coil to the substrate unit by fastening the induction coil between the cover element and the substrate unit, said fastening unit including a fastening element which is guided through the first through-flow opening and then guided through the second through-flow opening.

2. The induction oven device of claim 1, wherein the substrate unit includes a silicate.

3. The induction oven device of claim 2, wherein the fastening element includes a silicate.

4. The induction oven device of claim 2, wherein the substrate unit is capable of being pierced through, at least partially, in order to fasten the induction coil.

5. The induction oven device of claim 2, wherein the substrate unit is at least partially fibrous.

6. The induction oven device of claim 5, wherein the substrate unit includes a textile structure with a flat shape.

7. The induction oven device of claim 2, wherein the fastening element is embodied as a thread, said induction coil being fastened to the substrate unit via a seam which has the thread.

8. The induction oven device of claim 2, wherein the substrate unit at least partially is made of basalt.

9. The induction oven device of claim 2, wherein the substrate unit at least partially is made of glass fibers.

10. The induction oven device of claim 2, wherein the the cover element is arranged on a side of the induction coil which side lies opposite the substrate unit, said cover element restricting a movement of the induction coil on said side.

11. The induction oven device of claim 10, wherein the cover element includes a silicate.

12. An induction oven, comprising induction oven device, said induction oven comprising a heating unit including an induction coil having an electrical conductor, a substrate unit having at least a first through-flow opening and a second through-flow opening, a cover element and a fastening unit configured to fasten the induction coil to the substrate unit by fastening the induction coil between the cover element and the substrate unit, said fastening unit including a fastening element which is guided through the first through-flow opening and then guided through the second through-flow opening.

13. The induction oven of claim 12, wherein the substrate unit includes a silicate.

14. The induction oven of claim 12, wherein the fastening element includes a silicate.

15. The induction oven of claim 12, wherein the substrate unit is capable of being pierced through, at least partially, in order to fasten the induction coil.

16. The induction oven of claim 12, wherein the substrate unit is at least partially fibrous.

17. The induction oven of claim 16, wherein the substrate unit includes a textile structure with a flat shape.

18. The induction oven of claim 12, wherein the fastening element is embodied as a thread, said induction coil being fastened to the substrate unit via a seam which has the thread.

19. The induction oven of claim 12, wherein the substrate unit at least partially is made of basalt.

20. The induction oven of claim 12, wherein the substrate unit at least partially is made of glass fibers.

21. The induction oven of claim 12, wherein the cover element is arranged on a side of the induction coil which side lies opposite the substrate unit, said cover element restricting a movement of the induction coil on said side.

22. The induction oven of claim 21, wherein the cover element includes a silicate.

23. A method for producing an induction oven device, said method comprising:
    guiding a fastening element through a first opening of a substrate unit and a second opening of the substrate unit; and
    fastening an electrical conductor of an induction coil of a heating unit to the substrate unit by fastening the induction coil between a cover element and the substrate unit.

* * * * *